United States Patent [19]

Kuroda et al.

[11] Patent Number: 5,429,808
[45] Date of Patent: Jul. 4, 1995

[54] WET-TYPE EXHAUST GAS DESULFURIZING APPARATUS

[75] Inventors: Hiroshi Kuroda; Shigeru Nozawa; Masakatsu Nishimura; Toshio Katsube; Takanori Nakamoto, all of Kure, Japan

[73] Assignee: Babcock-Hitachi Kabushiki Kaisha, Japan

[21] Appl. No.: 262,771

[22] Filed: Jun. 20, 1994

Related U.S. Application Data

[63] Continuation of Ser. No. 902,442, Jun. 17, 1992, abandoned, which is a continuation of Ser. No. 402,606, Sep. 5, 1989, abandoned.

[30] Foreign Application Priority Data

Sep. 6, 1988 [JP] Japan ............... 63-221303

[51] Int. Cl.$^6$ .................... F01N 3/08; C01B 17/00
[52] U.S. Cl. ................... 422/176; 261/87; 261/89; 261/93; 423/243.03
[58] Field of Search ............ 422/176; 261/87, 89, 261/93; 423/243.03

[56] References Cited

U.S. PATENT DOCUMENTS

| | | | |
|---|---|---|---|
| 2,404,679 | 7/1946 | Andron et al. | 261/59 |
| 2,515,538 | 7/1950 | Wall | 261/87 |
| 2,875,897 | 3/1959 | Booth | 261/87 |
| 3,108,146 | 10/1963 | Gross | 261/93 |
| 3,584,840 | 6/1971 | Fuchs | 259/23 |
| 3,778,233 | 12/1973 | Blough et al. | 261/87 |
| 3,802,674 | 4/1974 | Hori | 261/93 |

FOREIGN PATENT DOCUMENTS

| | | |
|---|---|---|
| 123146 | 10/1972 | Denmark . |
| 155715 | 8/1983 | Denmark . |
| 166308 | 4/1993 | Denmark . |
| 1189522 | 3/1965 | Germany . |
| 2735608 | 2/1978 | Germany . |
| 3104777 | 9/1982 | Germany . |
| 167024 | 12/1980 | Japan ............... B01D 53/34 |
| 60-132830 | 9/1985 | Japan . |
| 2110550 | 6/1983 | United Kingdom . |
| 2171400 | 8/1986 | United Kingdom . |

OTHER PUBLICATIONS

Nozaki, S. "Gas/Liquid Contact Device" Translation of JP 55-167024. 1980.
*Chemical Engineers' Handbook*, 5th ed. New York, McGraw-Hill, 1973. pp. 18–61. 1973.

*Primary Examiner*—Michael G. Wityshyn
*Assistant Examiner*—T. J. Reardon
*Attorney, Agent, or Firm*—Antonelli, Terry, Stout & Kraus

[57] ABSTRACT

An apparatus for wet process exhaust gas desulfurization including a spraying portion for spreading absorbent slurry including calcium compound, an absorbing tower for bringing the absorbent slurry sprayed from the spraying portion into contact with exhaust gas including sulfur oxides from opposite directions so as to absorb the sulfur oxides in the exhaust gas into the absorbent slurry, a slurry tank disposed below the absorbing tower for receiving the absorbent slurry from the absorbing tower, a plurality of stirrers for stirring each stirrer being an axial flow type agitator having a propeller, and circular system for circulating the absorbent slurry from the slurry tank to the spraying portion. The apparatus further includes a plurality of nozzles for feeding oxidizer gas including oxygen into the absorbent slurry from a backside of each propeller towards a periphery thereof uniformly with respect to a circumferential direction, thereby bubbling the oxidizer gas finely around each propeller.

19 Claims, 15 Drawing Sheets

GYPSUM RECOVERY PROCESS

WET-TYPE EXHAUST GAS DESULFURIZING APPARATUS

This application is a Continuation of application Ser. No. 07/902,442, filed Jun. 17, 1992, now abandoned, which is a continuation of application Ser. No. 07/402,606, filed Sep. 5, 1989, now abandoned.

BACKGROUND OF THE INVENTION

The present invention relates to a wet-type exhaust gas desulfurizing apparatus for a thermal power station or the like, and more particularly to a wet-type exhaust gas desulfurizing apparatus suitable for accelerating oxidation of sulfurous calcium produced in absorber slurry.

A desulfurizing apparatus according to a limestone-plaster method is well known as a wet-type exhaust gas desulfurizing apparatus, which is used for absorbing sulfur oxide (hereinafter abridged as SOx) contained in the exhaust gas while using a calcium compound as an absorber, and for softening sulfurous calcium produced through the reaction into plaster that is stable. The plaster is collected by an auxiliary produced material.

The desulfurizing reaction according to the limestone plaster is represented by the following formulae.

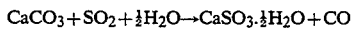

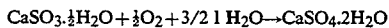

In such a conventional wet-type exhaust gas desulfurizing apparatus, an absorbent tower for absorbing SOx contained in the exhaust gas by contacting the slurry containing the absorber with the exhaust gas in a gas-liquid phase and an oxidizing tower for oxidizing sulfurous calcium that is formed through the reaction are provided separately from each other.

In order to simplify the structure of this apparatus, the present applicants have proposed, as in Japanese Utility Model Unexamined Publication No. 60-132830, another apparatus in which the absorbing reaction and the oxidation reaction are carried out in a single tower. Namely, in that apparatus, air is blown to a portion close to an agitator provided within a slurry recirculation tank located in a lower portion of the absorbing tower, so that the sulfurous calcium contained in the slurry is oxidized with the air bubbled by the agitator.

FIG. 18 shows an overall schematic view of that apparatus. The latter is composed mainly of a dust removing tower 102 for removing dust from an exhaust gas 101 and an absorbing tower 103 for absorbing SOx contained in the exhaust gas 101, oxidizing the chemical products produced through the desulfurizing reaction and collecting the products as plaster.

The exhaust gas 101 supplied from a boiler (not shown) is processed through dust-removal and is cooled in the dust removing tower 102, if necessary. In the dust removing tower 102, a recirculation fluid 105 contained in a recirculation tank 104 is raised by a recirculation pump 106. The recirculation fluid 105 is sprayed within the dust removing tower 102 for removing dust, hydrogen chloride (HCl) and hydrogen fluorine (HF) from the exhaust gas. Agitators 107 for preventing precipitation are provided within the recirculation tank 104.

The exhaust gas 101 from which the dust has been removed is fed to the absorbing tower 103 where the exhaust gas is brought into contact with absorbent slurry 109 composed mainly of limestone and plaster and sprayed from spraying portions 108. The exhaust gas 101 from which SOx is removed through the contact is passed through a demister 110 and then is discharged from a top portion of the absorbent tower 103 to the outside.

The slurry 109 that has absorbed SOx falls downwardly and is temporarily retained in a slurry recirculation tank 111 provided integrally with a lower portion of the absorbent tower 103. The retained slurry 109 is agitated by agitators 112A provided in the lower portion of the tank 111 and is fed to the spraying portions 108 of the upper portion of the absorbent tower 103 through a slurry line 114 by a recirculation pump 113. The above-described absorbing operation is repeated.

On the other hand, air pressurized by a compressor 115 is supplied to a portion close to agitators 112B for the oxidation reaction through air feed pipes 117. The air is bubbled by the agitation action of the agitators 112B to oxidize sulfurous calcium in contact with the slurry 109 retained in the tank 111.

In this apparatus, it should be, however, noted that the air 116 is supplied through only one portion relative to a rotary vane of each oxidation agitator 112B. In addition, due to the fact that a specific weight of the air 116 is much smaller than that of the slurry 109, the region close to the rotary vane is separated into a region where a large amount of air is present and another region where a large amount of slurry 109 is present. As a result, the air 116 will not be sufficiently bubbled into fine bubbles in the slurry 109. Also, the air is brought into contact with the slurry 109 under the condition that the bubble size of the air be kept at a relatively large level, so that the oxidation of the sulfurous calcium would not be well performed as a whole.

Also, as described above, the two portions which are composed mainly of air 116 and slurry 109, respectively, are formed in the rotary region of the vane, so that an unbalanced load is imposed on the agitator 112B. As a result, the apparatus would suffer a technical problem such as generation of vibration and noises.

FIGS. 19 and 20 are a partially sectional front view and a partially sectional plan view showing a soda water producing apparatus disclosed in U.S. Pat. No. 2,404,679.

Referring to FIGS. 19 and 20, water 151 is held in a tank 150, bearings 154a and 154b are mounted on central portions of an upper cover 153 and a bottom plate 152, respectively. A hollow rotary shaft 155 is rotatably supported between the upper and lower bearings 154a and 154b. Spinning tubes 156 and rotary vanes 157 are alternately provided in plural stages around and on a portion of the rotary shaft 155 dipped into the water 151.

In the upper cover 153, there is formed a pressure gas feed path 158 whose tip end is in communication with an axial hole 159 of the rotary shaft 155. The lower end of the axial hole in turn is closed as shown in FIG. 20.

A carbonated gas 160 fed under pressure from the pressure gas feed path 158 is passed through the axial hole 159 and is injected into the water from the respective spinning tubes 156 as bubbles 161. The injection energy of the carbonated gas 160 injected from the spinning tubes 156 causes the spinning tubes 156 and the rotary vanes 157 to rotate together in the clockwise direction as shown in FIG. 20. As a result, the water 151 is agitated within the tank 151.

However, in this apparatus, since the spinning tubes 156 and the vanes 157 are rotated together, there is almost no relative movement between the bubbles 161 and the vanes 157. As a result, relatively large bubbles are generated unlike the present invention according to which minute bubbles are generated due to shearing effect concomitant with the rotation of the vanes 157 as later described. Also, if the feed pressure of the carbonated gas 160 would be increased in order to sufficiently effect the agitation of the rotary vanes 157, the bubbles 161 would be injected radially outwardly beyond the rotary region 162 of the vanes 157 (see FIG. 20) so that there would be almost no contact with the rotary vanes 157. In this case, a desired agitation or mixture would not be attained.

OBJECTS AND SUMMARY OF THE INVENTION

In order to overcome the above-noted defects inherent in the prior art, an object of the present invention is to provide a wet-type exhaust gas desulfurizing apparatus which is capable of perform a uniform oxidation of sulfurous calcium to a desired condition.

In order to attain this and other objects, according to the present invention, there is provided a wet-type exhaust gas desulfurizing apparatus which comprises:

An absorbing tower having a spraying portion for spraying absorbent slurry containing a calcium compound such as lime or limestone, for contacting the absorbent slurry sprayed from the spraying portion with the exhaust gas containing SOx, thereby absorbing SOx contained in the exhaust gas into the slurry;

a slurry tank provided in a lower portion of the absorbing tower for receiving the absorbent slurry dropped from the absorbing tower, the slurry tank having a axial flow type agitator laterally provided through circumferential walls; and a recirculation system for feeding the absorbent slurry, reserved in the slurry tank, to the spraying portion of the absorbing tower.

The apparatus may comprise an oxidizing gas supplying means for substantially uniformly supplying oxidizing gas, containing oxygen such as air, from rear sides of the rotary vanes of the agitators over the full circumference of the rotary region of the rotary vanes, whereby the oxidizing gas supplied from the oxidizing gas supplying means is bubbled minutely in the absorbent slurry by the rotation of the vanes.

As described above, by supplying substantially uniformly the oxidizing gas over the full circumference of the rotary region from the rear side of the rotary vanes, a thin gas film is formed in a surface of each rotary vane, the gas film is sheared by the contact with the slurry during the rotation of the vane, and minute bubbles are generated from the tip end of the vane. The minute bubbles are entrained in the slurry moving from the rear side to the front side of the vane by the rotation of the vane and are sprayed or dispersed over the tank, thereby contacting the slurry and accelerating the oxidation of the sulfurous calcium.

BRIEF DESCRIPTION OF THE DRAWINGS

In the accompanying drawings:

FIG. 1 is a schematic view showing an overall apparatus;

FIG. 2 is a plan view in cross section showing the arrangement of oxidizing agitators;

FIG. 3 is a view illustrating a dimensional relationship of an absorbing tower;

FIG. 4 is a side elevational view showing, partially in cross section, the oxidizing agitator;

FIG. 5 is a view illustrating a condition of generation of minute bubbles;

DESCRIPTION OF THE PREFERRED EMBODIMENTS

The present invention will now be described with reference to the accompanying drawings on the basis of several embodiments.

Figure 1:
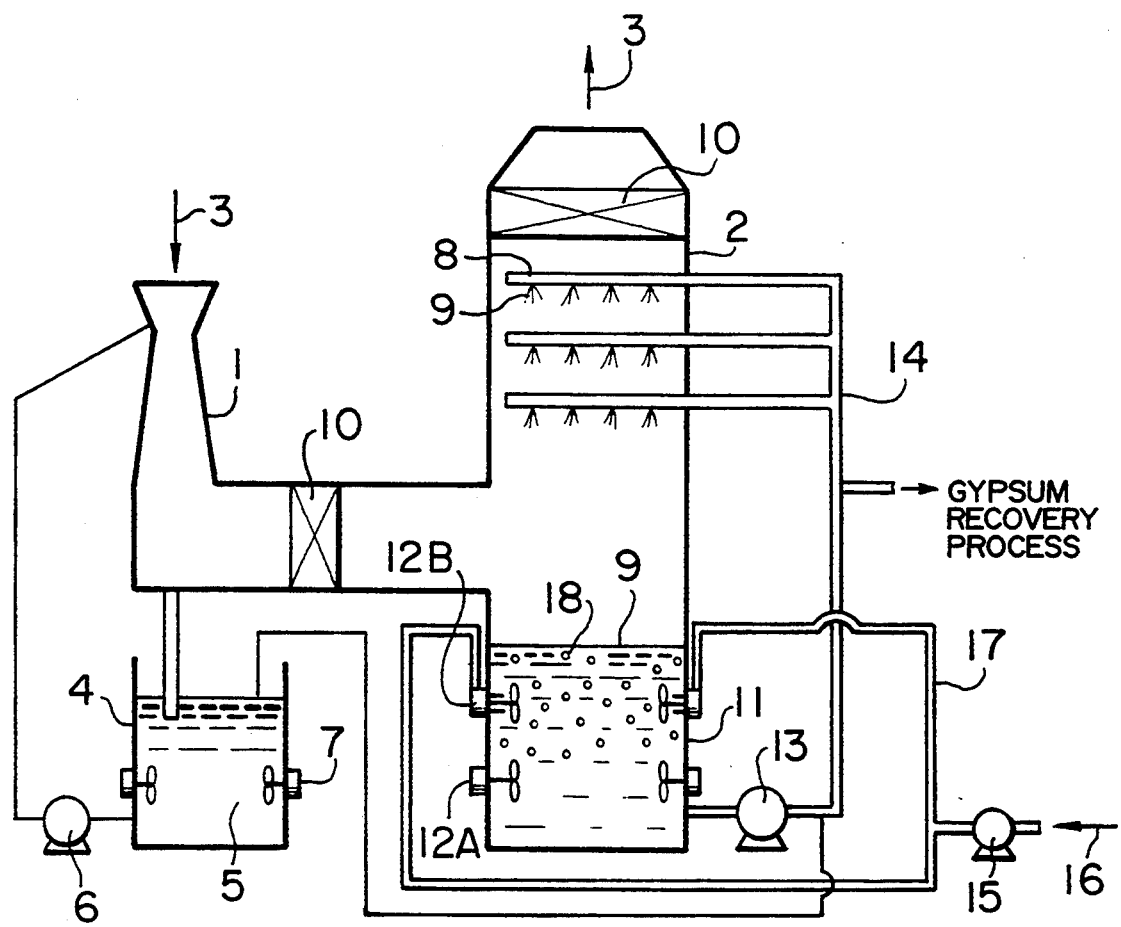
FIGS. 1 to 5 show a wet-type exhaust gas desulfurizing apparatus relating to a first embodiment of the invention.

FIGS. 1 through 5 show a wet-type exhaust gas desulfurizing apparatus in accordance with a first embodiment of the invention. First of all, the structure of the overall apparatus will be described with reference to FIG. 1. In FIG. 1, the apparatus is comprised mainly of a dust removing tower 1 and an absorbing tower 2 disposed downstream of the dust removing tower 1 in the exhaust gas flow direction thereof.

The exhaust gas 3 fed from a thermal power station (not shown) is processed through a dust removing treatment and a cooling treatment in the dust removing tower 1. A recirculation fluid 5 comprised mainly of water reserved in a recirculation tank 4 is raised by a recirculation pump 6 and is sprayed in the dust removing tower 1, thereby removing dust or hydrogen chloride (HCl) contained in the exhaust gas 3. Axial flow type agitators 7 for preventing precipitation are provided within the recirculation tank 4.

It should be noted that, in the case where a ratio of dust or oxidizing gas contained within the exhaust gas 3 is low and a temperature of the exhaust gas 3 is relatively low, the dust removing tower 1 may be dispensed with.

The exhaust gas 3 from which the dust has been removed as described above is fed to the absorbing tower 2 where the exhaust gas 3 is brought into contact with absorbent slurry 9 containing limestone that has been supplied from spraying portions 8. The exhaust gas from which SOx has been removed due to this contact is discharged from a top of the tower through a demistor 10.

The slurry 9 absorbing SOx is dropped downwardly and is temporarily reserved in a slurry recirculation tank 11 that is provided integrally with a lower portion of the absorbing tower 2. The reserved slurry 9 is agitated by axial flow type agitators exclusively for preventing the precipitation which are provided in the lower portion of the tank 11. The slurry 9 is fed to the spraying portions 8 of the upper portion of the tower through a slurry recirculation line 14 and is brought into contact with the exhaust gas 3 to perform the desulfurizing treatment in the same manner as described above.

On the other hand, air 16 pressurized by a pressurizing means such as compressor 15 or a blower is fed to the vicinity of agitators 12B for the oxidation reaction through air feed pipes 17. The air is bubbled into minute bubbles 18 by the action of the agitators 12B and is brought into contact with the slurry 9 in the tank 11, thereby oxidizing sulfurous calcium contained in the slurry. When the sulfurous calcium is oxidized to form plaster, a part of the slurry 9 is removed from the slurry recirculation line 14 and is fed to a plaster collecting process (not shown).

Figure 3:
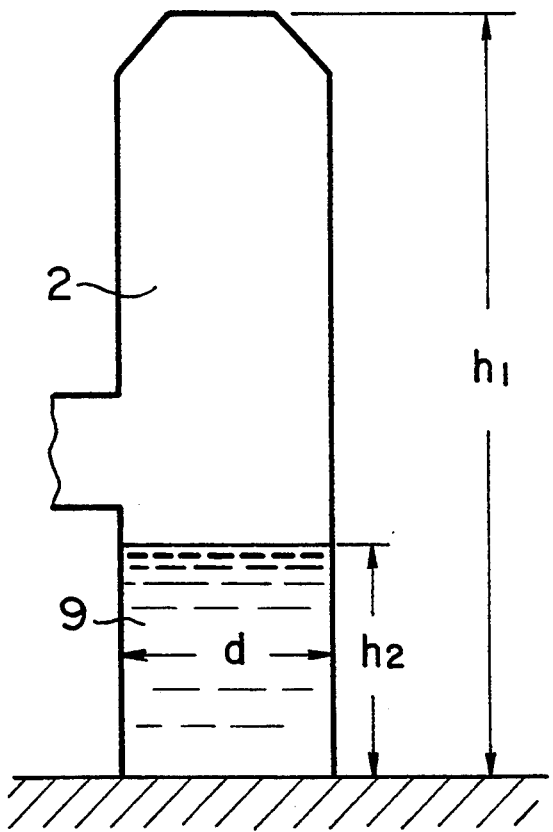

For example, in case of a wet-type exhaust gas desulfurizing apparatus used in a thermal power station of 500,000 KW capacity, as shown in FIG. 3, a total height h1 of the absorbing tower 2 is more than 30 m, an inner diameter d thereof is about 15 to 18 m, and a depth h2 of liquid of the reserved slurry 9 is about 7.5 to 13 m. The apparatus is thus large in size.

The arrangement and structure of the oxidizing agitator 12B will now be described.

In the apparatus for gas-liquid phase mixture, in addition to the axial flow type agitator to which the present invention pertains, there have been rotary atomizers (for example, disclosed in Japanese Utility Model Unexamined Publication No. 52-117543 and U.S. Pat. No. 3,802,674). Such rotary atomizers are constructed so that gas is fed under pressure into an interior of conical rotary portion and the bubbles are discharged while being sheared by lower edges by the centrifugal force of the rotary portion.

However, since the rotary atomizer has no effect of agitation, the agitation or mixture of liquid and gas is insufficient. Therefore, even if minute bubbles are generated by the edges of the rotary portion, it is impossible to attain a desired mixture or contact with the liquid.

Also, since it is impossible to dispose the rotary portion in a longitudinal posture due to its structure, it is proposed to arrange the rotary portion on a bottom of a slurry recirculation tank described later. However, since a large load of several tons is imposed on the tank bottom, there is a problem in supporting the load of the absorbing tower (slurry recirculation tank). It is further necessary to provide an underground chamber or basement for the arrangement of drive portions for the rotary atomizers or the like. Also, a cavitation would be generated in the recirculation pump. Moreover, in order to suppress the formation of cavitation, it would be proposed to elongate the shaft of the rotary portion. However, if this would be effected, there is a problem in vibration of the rotary portion at about 500 to 1,000 rpm. As noted above, it would be difficult to apply the rotary atomizer suitably. In consideration of the above-described problems, in the present invention, the laterally positioned axial flow type agitators are used in the apparatus.

In the foregoing embodiment, the oxidizing agitators 12B are arranged in one or more stages above the precipitation preventing agitators 12A as shown in FIG. 1. In other words, the oxidizing agitators 12B are provided away from suction ports of the recirculation pump 13, thereby preventing the cavitation of the recirculation pump 13 due to the suction of air.

Each of the agitators 12B is of the laterally extending axial flow type which passes through the circumferential wall of the slurry recirculation tank 11. The plural (two in the embodiment shown) agitators 12B are arranged along the circumferential direction. A rotary vane 19 of each agitator 12B is offset at an angle α in a predetermined direction relative to a phantom line passing through a center 0 of the slurry recirculation tank 11. (The offset direction is directed towards the left as viewed from above.) The offset angle α is preferable selected in a range of 10 to 25 degrees in order to effectively generate a swirling flow. In the embodiment, the offset angle is set at 15 degrees.

Figure 2:
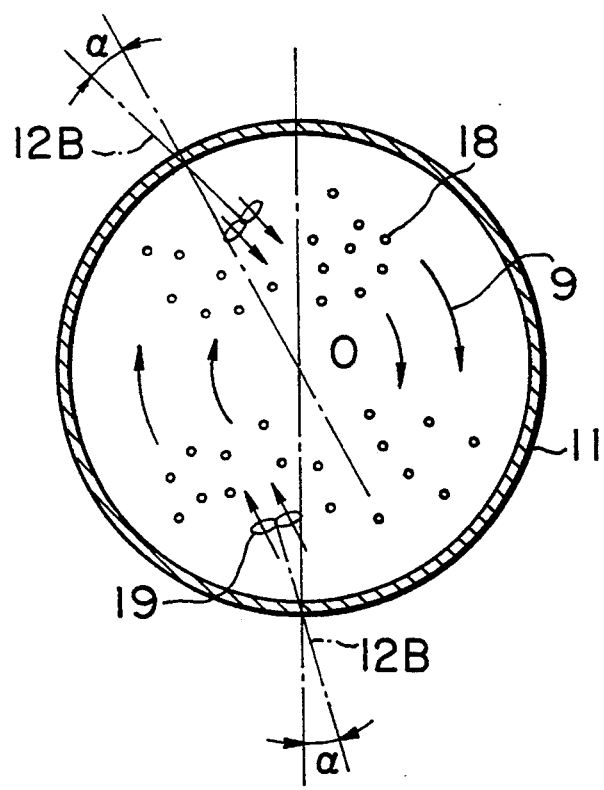

Therefore, the rotation of the vane 19 causes the slurry 9 located in the rear side of the vane to flow as indicated by the arrows in FIG. 2. The slurry flow direction is changed by collision against the circumferential wall of the tank 11 and is entrained in the flow of the slurry that has been generated by the adjacent agitator 12B, thereby generating the swirling flow of the slurry 9 within tank 11. Incidentally, such flow condition is generated also in the agitators 12A for the prevention of precipitation (two in the embodiment). Accordingly, the slurry as a whole reserved in the tank 11 is always fluidized into a single swirling flow during the operation.

Figure 4:
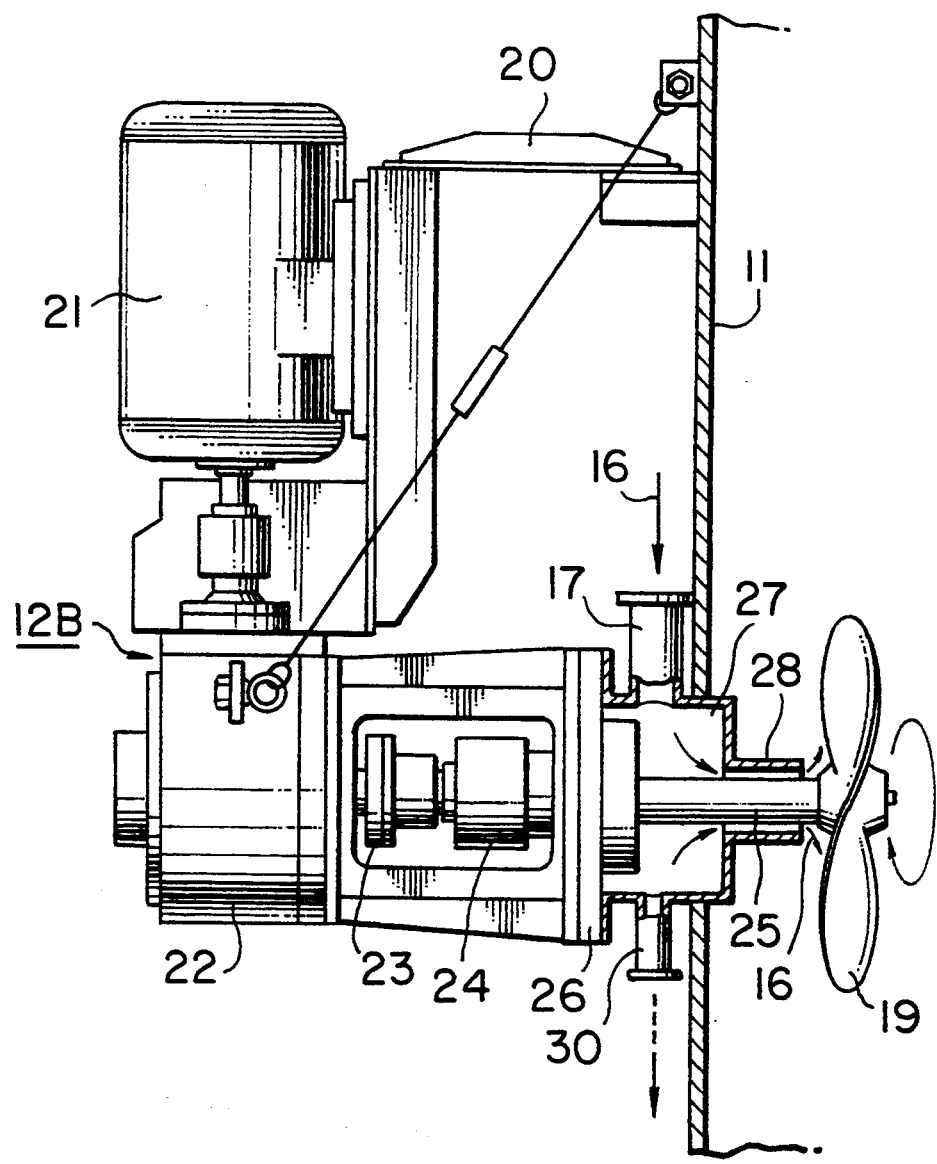

Each oxidation agitator 12B is of the axial flow type and includes, as shown in FIG. 4, a drive motor 21 mounted through a plate 20 on the circumferential wall of the tank 11, a gear box 22 for speed reduction, a coupling 23, a mechanical seal 24, a rotary shaft 25, three rotary vanes 19 and a mount seat 26. The rotational speed of the vanes 19 is ranged in about 250 to 2,000 rpm. The vanes 19 are of the propeller type and their pitch ratio is ranged in 1.0 to 1.75.

Figure 5:
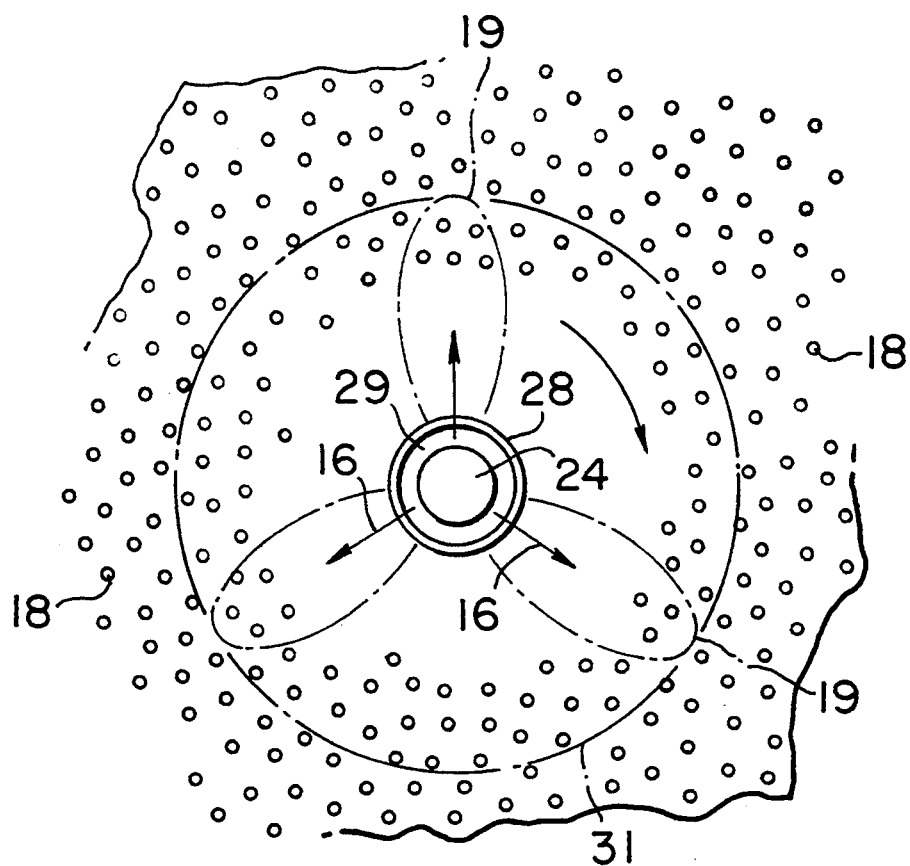

A chamber 27 having a predetermined volume is mounted so as to surround the rotary shaft 25 in the front side of the mount seat 26 in the agitator 12B. A nozzle 28 is provided at a tip end of the chamber 27. The nozzle 28 is coaxially arranged around the rotary shaft 25 at a predetermined interval in the circumferential direction. A tip end of the nozzle 28 extends close to proximal ends of the vanes of the rotary shaft 25. An annular injection port 29 is formed around the rotary shaft 25 as shown in FIG. 5.

As shown in FIG. 4, an air introduction pipe 17 is connected to an upper portion of the chamber 27, and a drain discharge pipe 30 is connected to a lower portion of the chamber 27.

In terms of short time, the output of the compressor or blower 15 is pulsated to generate pressure change. When the flow rate or pressure of the air 16 is lowered, the slurry is reversely flowed within the nozzle 28 to cause a scaling. In order to suppress the pressure change, the chamber 27 is provided. The chamber 27 may be provided in any location in the air introduction pipe. However, if the chamber 27 is provided upstream of the mechanical seal 24 in the agitator 12B as in the embodiment, the mechanical seal 24 is surrounded by the air 16 so that it is possible to keep the condition that the mechanical seal 24 may be out of contact with the slurry. As a result, the wear and corrosion of the mechanical seal are prevented to prolong its service life.

A valve (not shown) is mounted in midway of the drain discharge pipe 30 and is closed during the desulfurizing treatment. An amount of air of, for example, about 500 Nm³ per hour (for the single agitator) is fed through the air introduction pipe 17 to the chamber 27. The flow rate of the air 16 is increased to a predetermined level by the passage through a narrow gap between the rotary shaft 25 and the nozzle 28. The air is substantially uniformly injected over the entire circumference toward the proximal ends of the vanes 19 from the annular injection port opened toward the rear portion of the rotary vanes 19 in a thin air film.

The injected air 16 is guided by curved surfaces of the proximal ends of the respective vanes 19 and is flowed onto the smooth surfaces of the vanes 19 to form an extremely thin air film on the surfaces. Since the vanes 19 are rotated at the predetermined rpm, by the rotational energy, the air film is sheared in order from the end portions due to the contact with the slurry. The air film is separated and vibrated away from the outer peripheries of the rotating vanes 19 to form infinitely minute bubbles 18. The bubbles 18 are generated substantially uniformly over the entire circumference and inner side of the rotational region 31 of the vanes 19 as shown in FIG. 5. There is no phenomenon in which the rotational region is separated into the portion having a large amount of air (large bubbles) as in the prior art.

The thus produced minute bubbles 18 are entrained in the slurry flow toward from the rear side to the front side of the vanes 19 by the rotation of the vanes 19. The bubbles 18 are moved in the tank 11 together with the swirl flow of the slurry 9 (see FIG. 2). In the meantime, the sulfurous calcium is oxidized.

Subsequently, the suitable air outlet rate from the nozzle 28 in the embodiment will now be described.

The inventors made the experimental apparatus meeting the following conditions:
  diameter of slurry recirculation tank: 2200 mm
  height of slurry recirculation tank: 2500 mm
  mounted position of precipitation preventing agitator 12A from the bottom: 300 mm
  depth of liquid of reserved slurry 9: 2000 mm
  concentration of slurry 9: 1.06
  type of rotary vanes 19: propeller type
  pitch ratio of rotary vanes 19: 1.0
  outer diameter of rotary vanes 19: 200 mm
  outer diameter of rotary shaft 25: 32 mm
  inner diameter of nozzle 28: 42.4.

Figure 6:
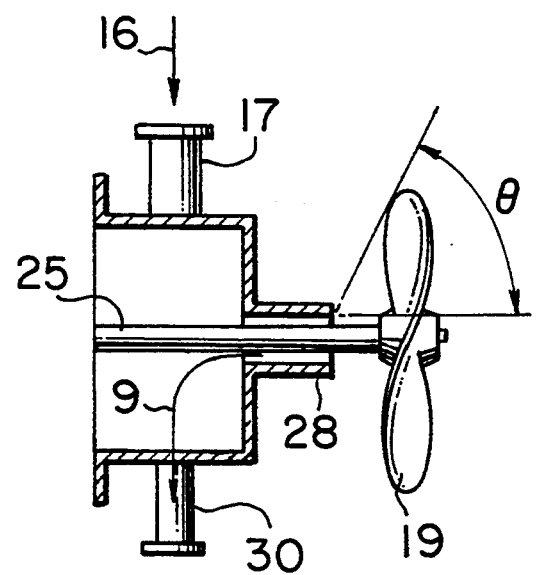
FIGS. 6 is a view illustrating a test condition of the apparatus according to this embodiment.

In this apparatus, in the case where the outlet flow rate of the air 16 from the nozzle 28 was changed variously, the flow rate of part of the reserved slurry 9 through the nozzle 28 from the drain discharge pipe 30 was measured as shown in FIG. 6. The result was shown in FIG. 7.

Figure 7:
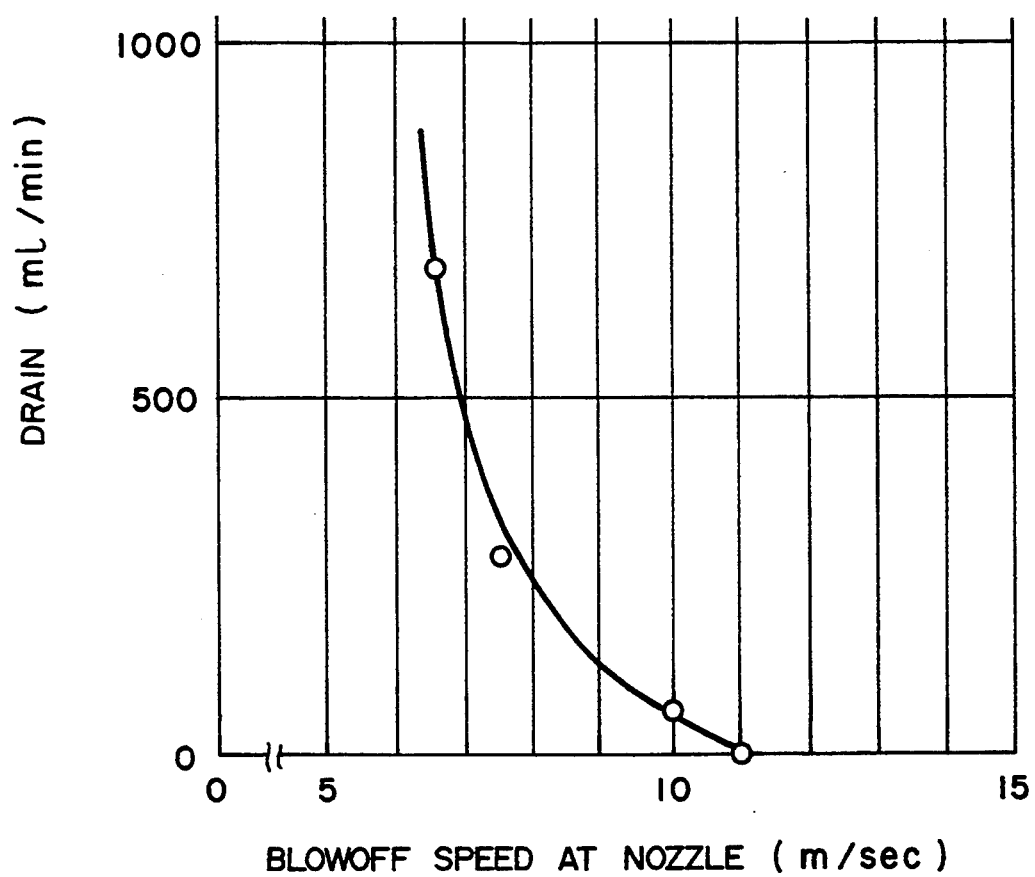
FIG. 7 is a graph showing a relationship between a nozzle outlet flow rate and a drain amount.

As is apparent from FIG. 7, it will understood that, if the nozzle outlet flow rate of the air 16 is lower than 10 m/sec, the slurry 9 is introduced into the chamber 27 through the nozzle 9 (since the drain discharge valve provided in the drain discharge pipe 30 is always closed during the desulfurizing treatment) and reserved in the chamber 27. As a result, solid components contained in the slurry 9 are piled to cause the clogging of the nozzle 28. On the other hand, if the nozzle outlet flow rate exceeds 10 m/sec, the invasion of the slurry 9 into the nozzle 28 is substantially prevented by the flow of air, and the discharge amount of the slurry 9 is kept substantially at zero.

In the experimental apparatus, in the case where the nozzle outlet flow rate was changed variously the pressure loss of the nozzle portion was measured. The results are shown in FIG. 8.

Figure 8:
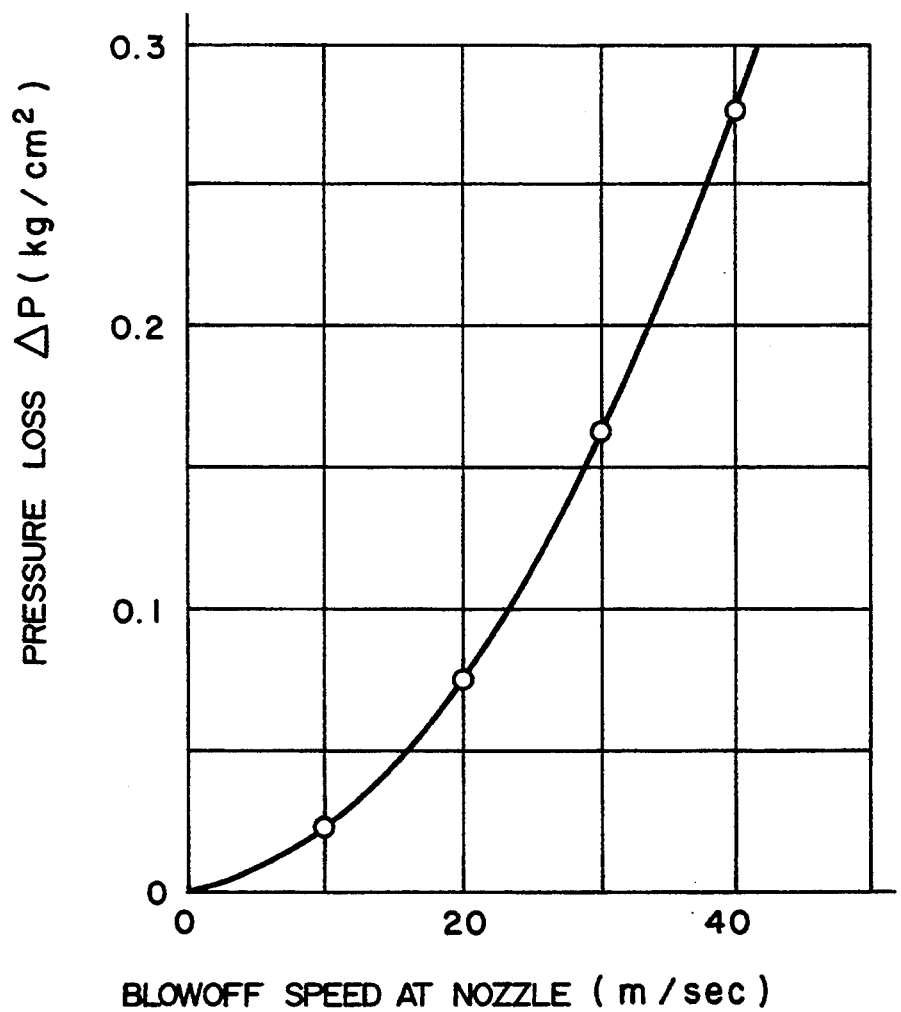
FIG. 8 is a graph showing a relationship between the nozzle outlet flow rate and a pressure loss.

As is apparent from FIG. 8, it will be understood that, since the pressure loss $\Delta P$ is increased by the increase of the nozzle outlet flow rate, it is necessary to increase the outlet amount of the compressor 15 feeding the air 16. As a result, there is a problem that the consumption of electric power in the compressor 15 would be increased or noises would be generated. Therefore, it is not desired to excessively increase the pressure loss, and it is preferable to decrease the nozzle outlet flow rate below 40 m/sec. Also, if the nozzle outlet flow rate would be excessively increased, the air 16 would be blown to the front side of the rotary vanes 19. It is difficult to uniformly generate minute bubbles 18 by the rotation of the vanes 19. It is therefore necessary to suppress the nozzle outlet flow rate below 40 m/sec.

In view of the foregoing factors, in order to maintain the nozzle outlet flow rate of the air 16 within the range of 10 to 40 m/sec, it is necessary to set the supply amount of the air 16 and the diameters of the rotary shaft 25 and the nozzle 28 suitably.

The inventors reviewed the positional relationship of the nozzle tip end portion relative to the rotary vanes 19, which would effect the condition of bubble generation, in the foregoing experimental apparatus.

Figure 9:
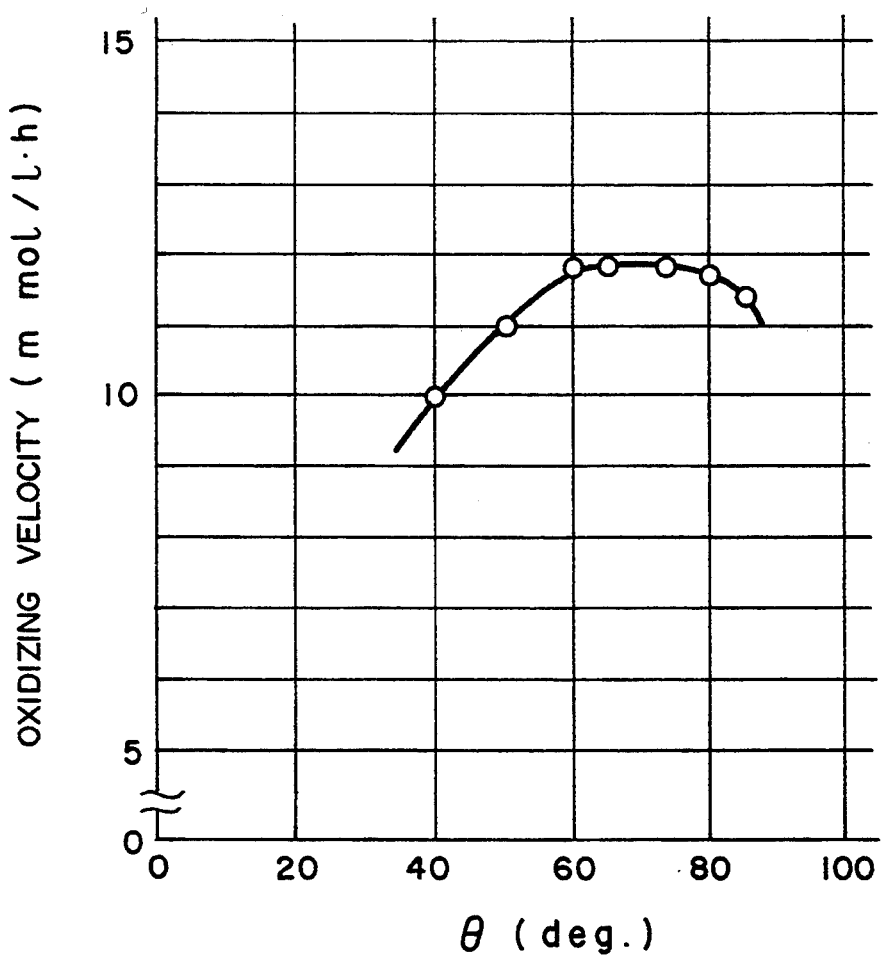
FIG. 9 is a graph showing a relationship between an angle $\theta$ and an oxidiation rate.

Namely, in the case where the nozzle outlet flow rate of the air was kept constant at 15 m/sec, and the angle $\theta$ defined by the horizontal line passing through the end portion of nozzle 28 and a straight line connecting the end portion and an outer end portion of the vane 19 was changed variously as shown in FIG. 6, the oxidation rate of the sulfurous calcium was measured. The result is shown in FIG. 9. With respect to the oxidation rate, the concentration of $SO_3$ in the slurry 9 was measured every constant time period according to an iodimetric method. The oxidation rate of the sulfurous calcium was calculated on the basis of the measurement result.

As is apparent from FIG. 9, if the angle $\theta$ is 60 degrees or less, the oxidation rate is low. This means that the position of the nozzle end portion is too remote from the rotary vanes 19. Even if the air 16 is injected from the nozzle 28 at a predetermined flow rate, the air will not sufficiently reach the rotary vanes 19 but the air becomes large bubbles in the midway to be raised in the slurry 9. This is caused by the poor contact between the sulfurous calcium and the air.

On the other hand, if the angle $\theta$ exceeds 80 degrees, the oxidation rate is lowered. This means that the end portion of the nozzle is too close to the rotary vanes 19. A part of the air discharged from the nozzle 28 is blown through the rotary vanes. As a result, large bubbles are formed. This would be caused by the poor contact between the sulfurous calcium and the air.

In contrast, in the case where the angle θ is ranged in 60 to 80 degrees, minute bubbles 18 are uniformly generated by the rotation of the vanes 19. The oxidation of the sulfurous calcium is accelerated with a high oxidation rate.

Figure 10:
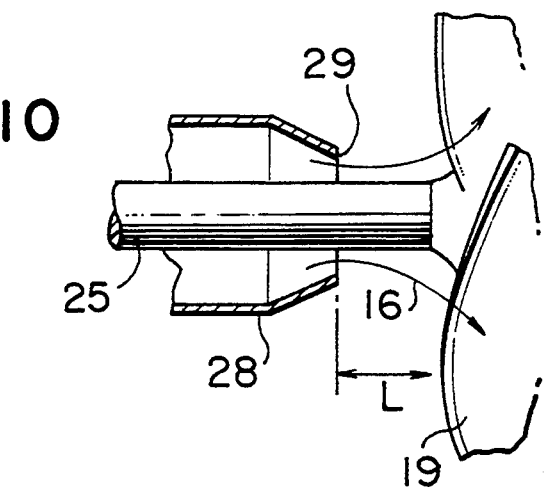
FIG. 10 is an enlarged view showing a modification of a nozzle.

FIG. 10 is an enlarged view showing a modification of the nozzle 28. In the foregoing embodiment, the nozzle 28 is formed of a straight pipe. However, it is possible to use a tapered nozzle 28 at its end portion instead of the straight pipe.

If such a tapered nozzle 28 is used, the nozzle outlet rate is necessarily increased. Therefore, even if the length L from the nozzle end to the rotary vanes 19 would be increase, it is possible to well provide the air 16 to the surfaces of the rotary vanes 19. Therefore, it is possible to correspondingly reduce the length of the nozzle 28. Thus, the fluidization of the reserved slurry 9 is accelerated to thereby suppress the generation of scaling and to reduce the cost.

Incidentally, in the case where this nozzle 28 is used, it is impossible to apply the suitable relationship between the nozzle outlet flow rate and the angle θ described in connection with the foregoing embodiment.

Figure 11:
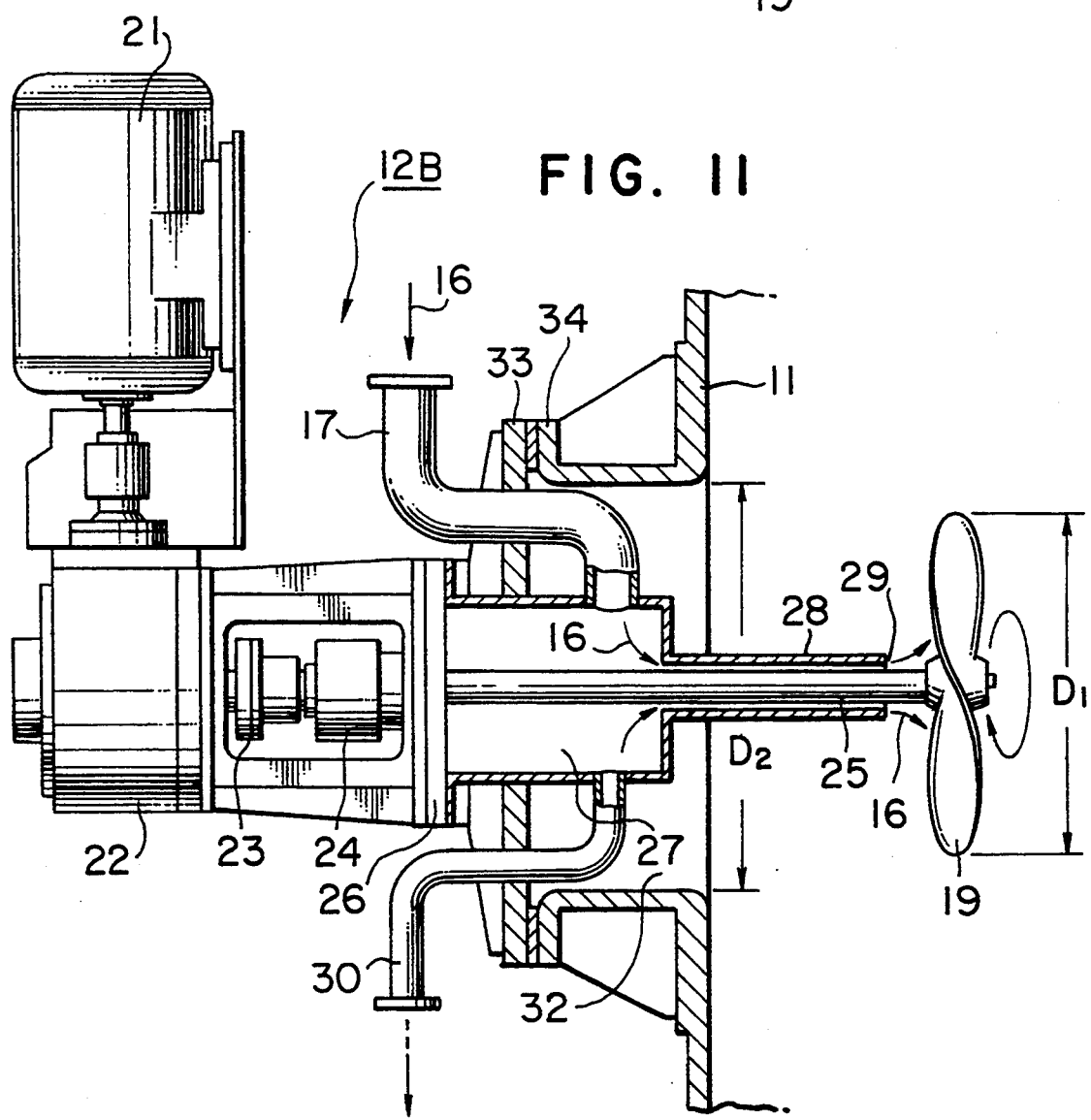
FIG. 11 is a side elevational view showing, partially in cross section, an agitator used in a wet-type exhaust gas desulfurizing apparatus in accordance with a second embodiment of the invention.

FIG. 11 is a side elevational view showing, partially in cross section, an oxidation agitator in accordance with a second embodiment of the invention.

In this embodiment, an insertion hole 32 having a diameter D2 larger than an outer diameter D1 of the rotary vanes 19 is formed in a circumferential wall of the tank 11. A body mount seat 33 is provided for supporting an air introduction pipe 17, a chamber 27, a drain discharge pipe 30 and the like. The rotary vanes 19 are inserted through the above-described insertion hole 32 into the tank 11 and the agitator is mounted with the body mount seat 33 being fixed to a flange 34 of the tank 11.

With such a structure, for example, when the vanes 19 are to be inspected or replaced, it is possible to pull the vanes 19 to the outside of the tank 11 by removing the body mount seat 33 away from the flange 34 without performing additional operation such as assembling a foothold for the inspection or replacement of the vanes. Thus, it is possible to simplify the working.

Figure 12:
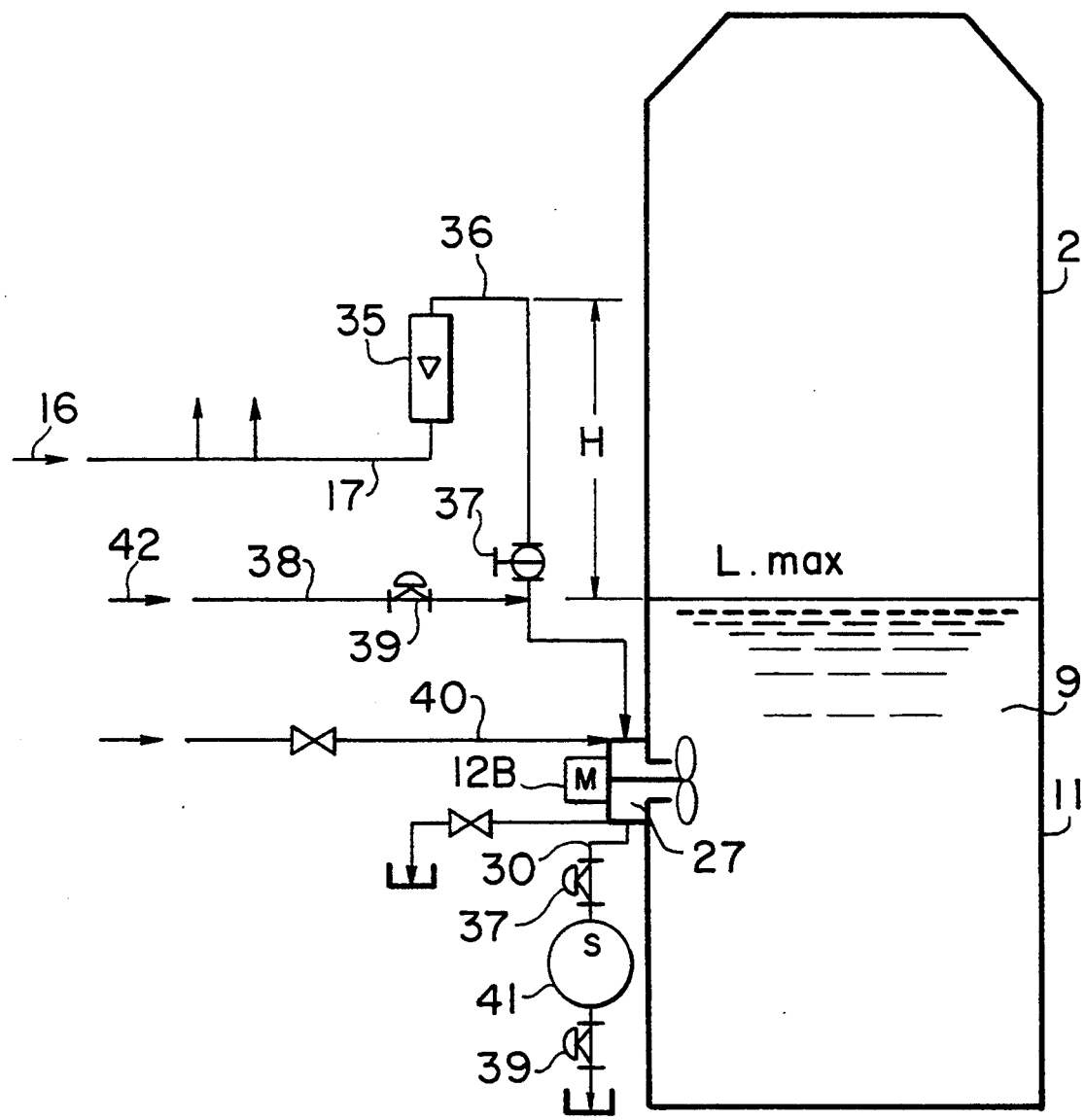
FIGS. 12 and 13 are schematic view showing third and fourth embodiments of the invention.

FIG. 12 is a schematic view for illustrating a third embodiment of the invention. In this embodiment, a portion 36 of the air introduction pipe 17 downstream of flowmeter 35 disposed in the midway of the pipe 17 is positioned by 1 m or more above a maximum level Lmax of the reserved slurry 9. A normally opened valve 37 is provided in the vicinity of the chamber 27 downstream of the portion 36. A water washing line 38 is connected just downstream of the valve 37. A normally closed valve 39 is provided in the midway of the water washing line 38.

A seal water line 40 for axial seal is connected to an upper portion of the chamber 27. A sight flow member 41 having a transparent portion is provided in the midway of a drain discharge pipe 30.

For instance, when an electric source of a compressor is inoperative due to a power suspension to stop a supply of air 16 to the chamber 27, a part of the reserved slurry 9 is reversely introduced into the air introduction pipe 17 through the chamber 27. In order to prevent this phenomenon, an automatically operated valve is used as the normally opened valve 37 provided close to the chamber 27 to interrupt the reverse flow of the slurry 9. However, such a valve is expensive and needs the provision of signal lines or wirings. This is not desirable.

Accordingly, in the embodiment, an ordinary valve other than an automatically operated valve is used as the normally opened valve 37, the portion 36 downstream of the flowmeter 35 is held above a maximum level Lmax of the reserved slurry 9, and a head H exceeding 1 m is provided between the downstream portion 36 and the maximum level Lmax. With such an arrangement, it is possible to prevent the reverse flow of the slurry 9 with a simple and low cost means. The slurry 9 may be prevented from flowing into the flowmeter 35. Incidentally, since the slurry 9 that flows reversely through the air introduction pipe 17 has an inertia, the head H is preferably set at 1 m or more.

Also, in a recent thermal power plant, a daily stop/start (DSS) is performed in general, For this reason, it is preferable to reduce a consumed electric power in the station by stopping the supply of air 16 in the case of the stop of operation of the thermal plant. However, if the supply of air 16 is stopped, a part of the slurry 9 will reversely flow into the air introduction pipe 17 through the chamber 27 as described above. Under such a condition, if the plant is restarted, there would be other problems such as wear of the rotary shaft 25 due to the accumulation of solid components contained in the slurry 9 in the chamber 27, and scaling within the air introduction pipe 17.

In order to deal with these problems, the water washing line 38 and the drain discharge pipe 30 are provided according to the embodiment. Prior to the restart, washing water 42 is flowed from the water washing line 38 to wash the air introduction pipe 17 and the chamber 27, thereby flow out the invading slurry 9 to the tank 11 and the drain discharge pipe 30. The sight flow member 41 provided in the midway of the drain discharge pipe 30 is provided for observing the washing condition in this case. The washing operation is finished by confirming that there is no slurry 9 in the sight flow member.

Figure 13:
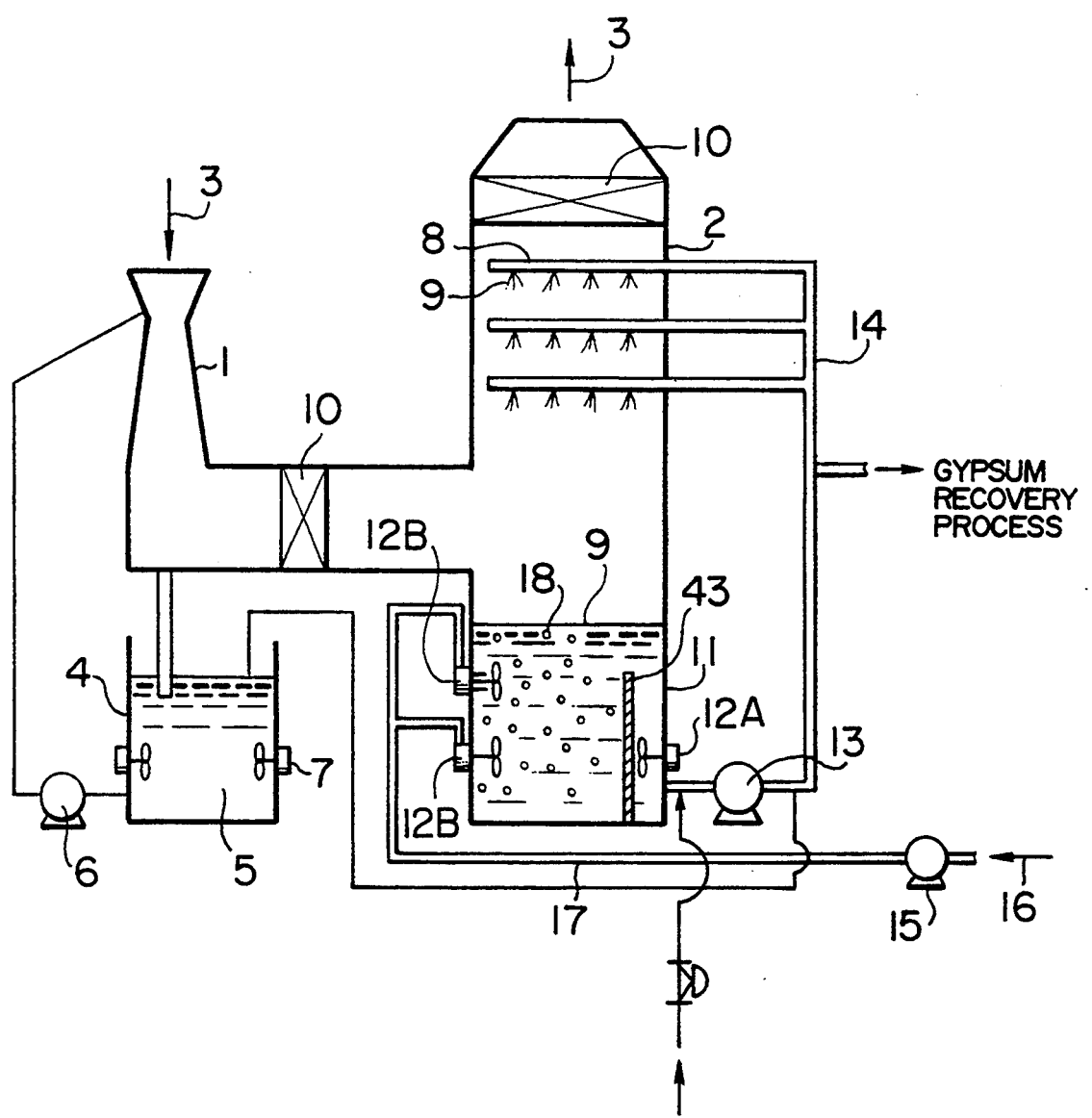

FIG. 13 is a schematic view showing a fourth embodiment of the invention.

It is general that a suction port of a recirculation pump 13 is mounted close to a bottom of slurry recirculation tank 11. Therefore, in the first embodiment, in order to prevent the cavitation of the recirculation pump 13, the air 16 is not provided to the agitators 12A located in the lowest position but are used exclusively for preventing the precipitation as shown in FIG. 1. In the first embodiment, the air 16 is supplied to the agitators 12B other than the lower agitators 12a so that the agitators 12B are used for preventing the oxidation and precipitation.

In the fourth embodiment, the agitator 12A relatively close to the suction port of the recirculation pump 13 is used only for preventing the precipitation. The agitator 12A is surrounded by a bubble invation preventing plate 43. The air 16 is supplied to the lower agitator 12B that is located relatively remotely from the suction port of the recirculation pump 13.

With such an arrangement, it is possible to prevent the cavitation of the recirculation pump 13 and simultaneously to generate minute bubbles 18 from the vicinity of the bottom of the tank 11. Therefore, it is possible to perform effectively the contact with the sulfurous calcium with a high oxidation rate.

Figure 14:
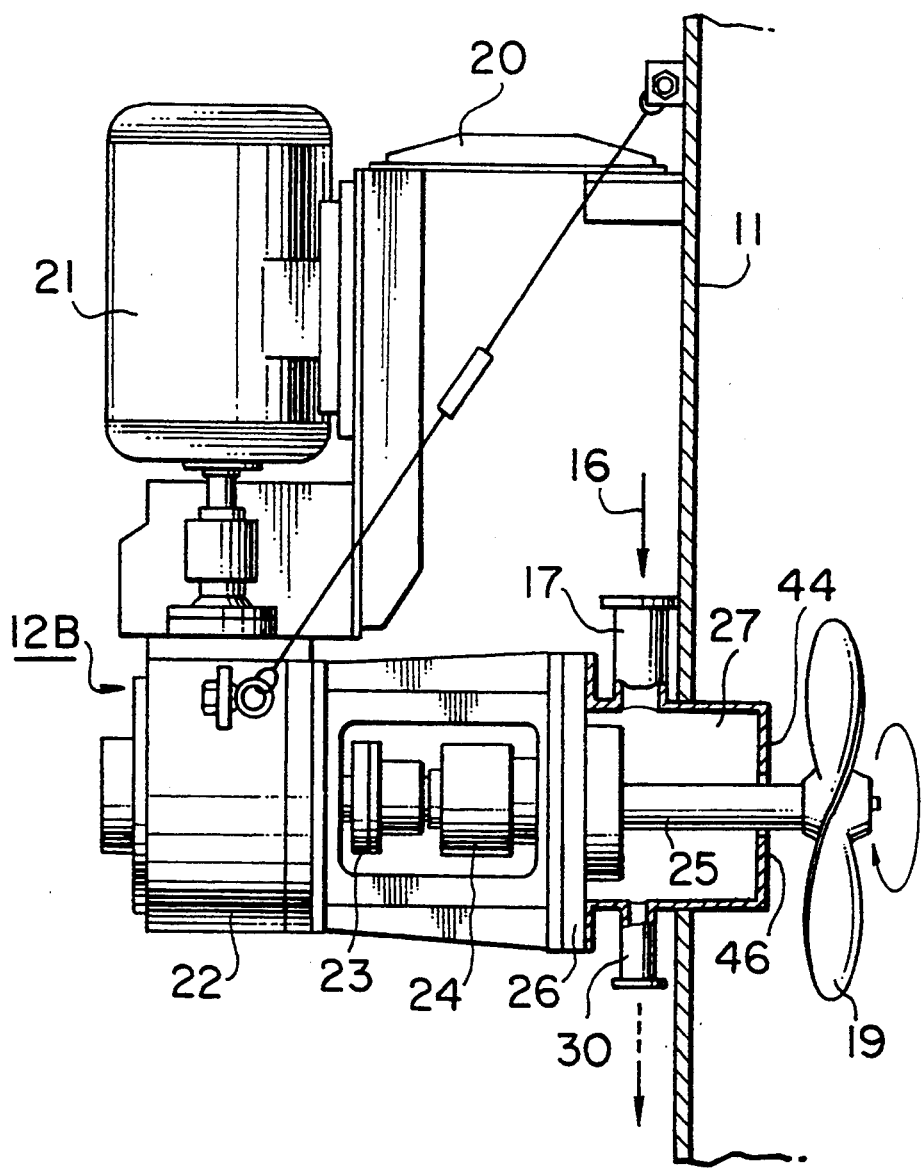
FIG. 14 is a side elevational view showing, partially in cross section, an agitator used in a wet-type exhaust gas desulfurizing apparatus in accordance with a fifth embodiment.
Figure 15:
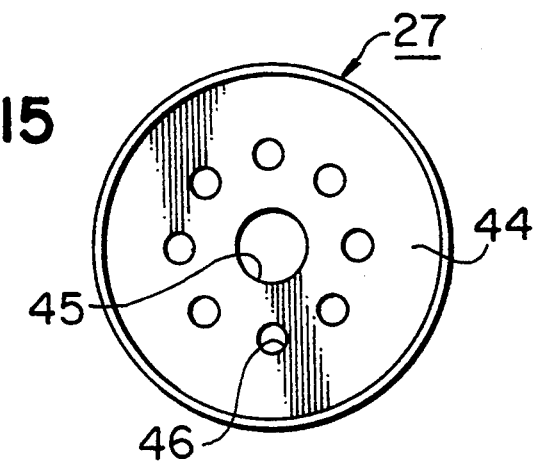
FIG. 15 is a frontal view showing a chamber used in the agitator shown in FIG. 14.

FIGS. 14 and 15 show a fifth embodiment of the invention. FIG. 14 is a side elevational view showing, partially in cross section, an agitator according to the fifth embodiment. FIG. 15 is a frontal view of a chamber used in the agitator shown in FIG. 14.

The chamber 27 used in the embodiment has an end plate 44 on a side confronting the rotary vanes 19. An insertion hole 45 (see FIG. 15) into which the rotary shaft 25 is inserted is formed in the central portion of the end plate 44. A plurality of nozzle holes 46 are formed in the circumferential direction around the insertion hole 45. Therefore, when the chamber 27 is mounted, the nozzle holes 46 are confronted with the rotary vanes 19 at a predetermined interval as shown in FIG. 14, so that the air 16 that has been supplied to the chamber 27 is to be injected from the respective nozzle holes 46 toward the rotating vanes 19.

A size and a distribution of the nozzle holes 46 are suitably selected so that the minute bubbles 18 are effectively and uniformly generated by the rotation of the vanes 19.

Figure 16:
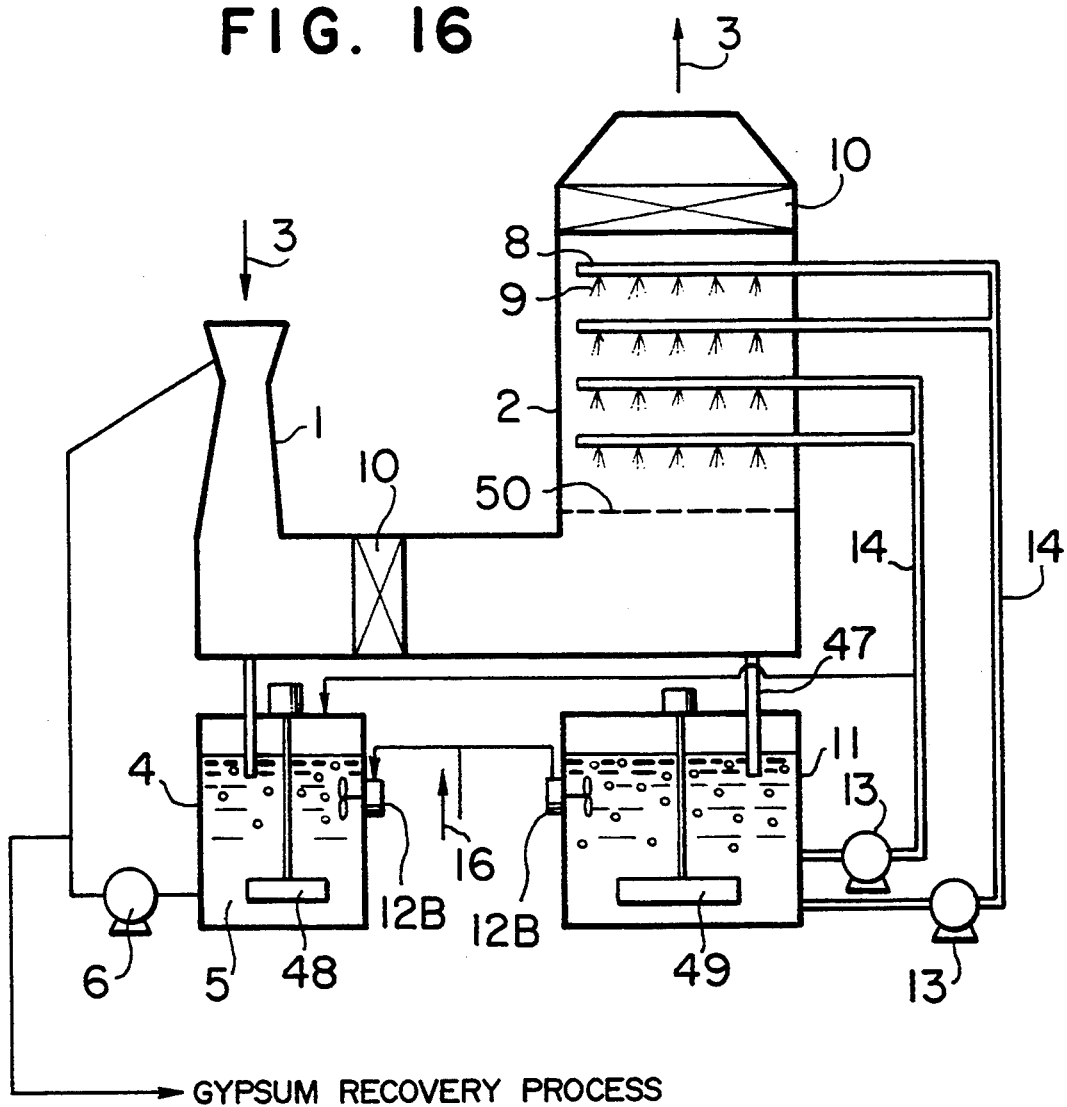
FIG. 16 is a schematic view showing a wet-type exhaust gas desulfurizing apparatus in accordance with a sixth embodiment of the invention.

FIG. 16 is a diagram showing a sixth embodiment of the invention. In this embodiment, the slurry recirculation tank 11 is disposed in the lower portion of the absorbing tower 2 but is separated away from the absorbing tower 2. The dropped slurry 9 within the absorbing tower 2 is introduced into the tank 11 through a connection pipe 47.

Vertical agitators 48 and 49 for preventing the precipitation are provided in the recirculation tank 4 and the slurry recirculation tank 11, respectively. An agitator 12B is also provided in the recirculation tank 4 on the dust removing tower 1. The air 16 is also supplied to the agitator 12B. A recirculation fluid (composed of the same components as the slurry 9) is discharged from the portion downstream of a recirculation pump 6 and is fed to a plaster collecting process. Reference numeral 50 denotes a porous plate for preventing the deflected flow.

Figure 17:
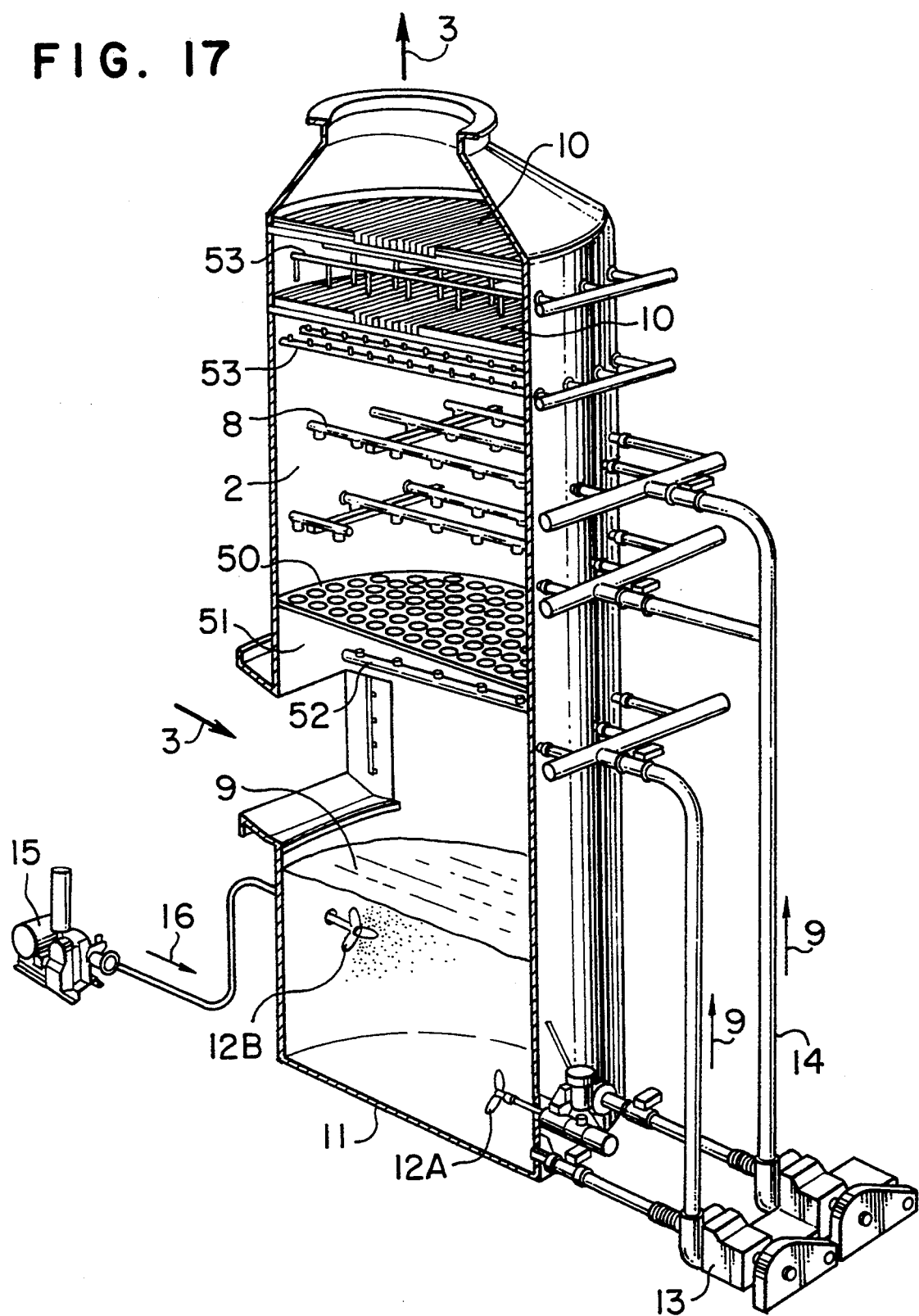
FIG. 17 is a perspective view showing a wet-type exhaust gas desulfurizing apparatus whose part has been removed for explanation, in accordance with a seventh embodiment of the invention.
Figure 18:
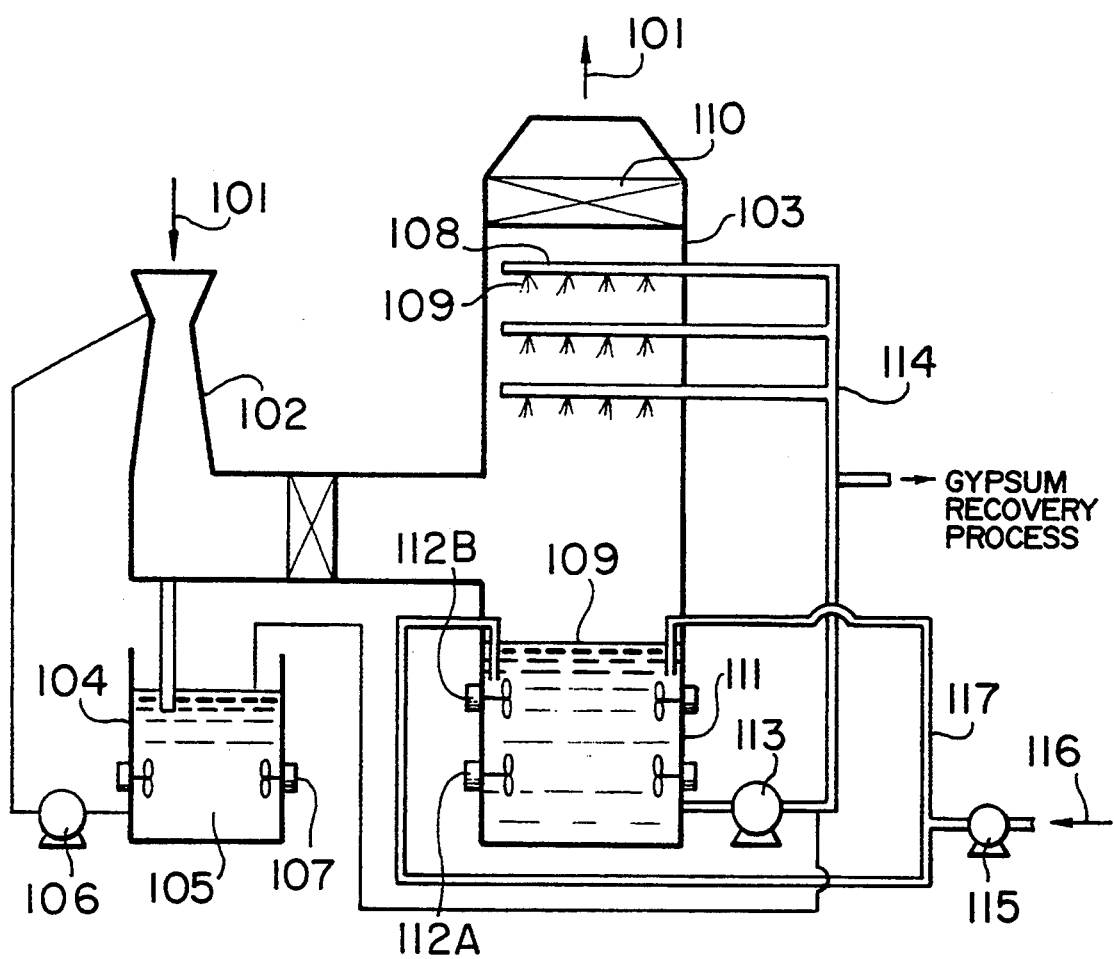
FIG. 18 is an overall schematic view showing a wet-type exhaust gas desulfurizing apparatus according to the prior art.
Figure 19:
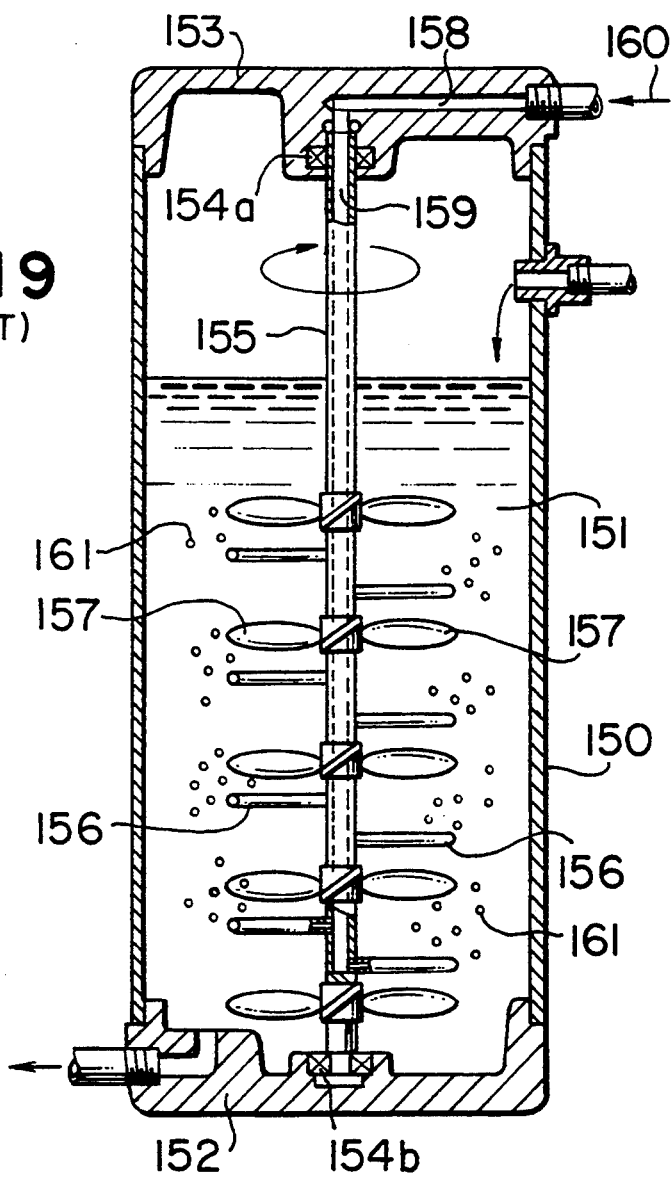
FIG. 19 is a front view showing, partially in cross section, a soda water producing apparatus according to the prior art.
Figure 20:
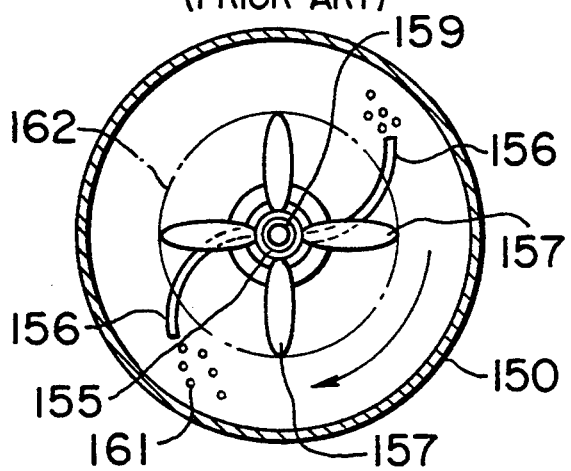
FIG. 20 is a plan view of the apparatus shown in FIG. 19.

FIG. 17 is a perspective view whose part has been removed for illustrating a seventh embodiment of the invention. In this embodiment, there is no dust removing tower 1. Instead thereof, a portion below a porous plate 50 is used as dust removing and cooling section 51. A spraying portion 52 for diffusing slurry 9 are provided close to the porous plate 50. In order to prevent the scaling of the porous plate 50, injection ports of the spraying portion 52 are directed to the porous plate 50 so that the slurry 9 is applied to the porous plate 50. Reference numeral 53 denotes a water washing portion of demistors.

Although, in the foregoing embodiments, air is used as oxidizing gas, the present invention is not limited thereto or thereby. It is possible to use a high active oxidation gas having a high oxygen concentration. The oxidizing gas having a high oxygen concentration (for example, 25 to 40% by volume) may be obtained by the characteristic that a high molecular film such as a compound film of, for example, silicone and polyimide selectively filtrate oxygen rather than nitrogen contained in the air. The oxygen enriched gas may readily be produced by using a well known unit as a silicone compound film module provided with the foresaid compound film.

As described above, according to the present invention, it is possible to generate the minute bubbles from the end portions of the rotary vanes in a uniform manner by supplying uniformly the oxidizing gas over the full circumference of the rotational region of the rotary vanes from the rear side of the rotary vanes. As a result, the minute buttles are entrained in the slurry fluidized from the rear portion to the front portion of the vanes by the rotation of the vanes, thereby being brought into sufficient contact with the slurry to perform the oxidation of sulfurous calcium.

The test conditions under which the pilot test was conducted for the wet-type exhaust gas desulfurizing apparatus in accordance with the first embodiment are shown with their results, as follows.

exhaust gas amount: 3000 Nm$^3$/h
SO$_3$ concentration: 3000 ppm
number of the precipitation preventing agitators: two
number of the oxidation preventing agitators: two
air amount for oxidation: 80 Nm$^3$/h
slurry/gas: 22.4 l/Nm$^3$
limestone excess rate: 2%
operational period: about 8500 hours From the results under the foregoing condition, it was found that the desulfurizing rate of the exhaust gas was 95% and the oxidation rate of the sulfurous calcium was 99.8%. Therefore, it was possible to collect the high quality powdery plaster simply by removing and dehydrating the slurry from the slurry recirculation line.

Also, since any unbalanced load is not generated in the agitator in the apparatus according to the invention, any vibration or noise may be eliminated to prolong the service life of the apparatus.

What is claimed is:

1. An apparatus for wet process exhaust gas desulfurization, said apparatus removing sulfur oxide-containing compounds from an exhaust gas, said apparatus comprising:

contacting means for bringing said exhaust gas into contact with an absorbent slurry;

a tank, having a perimetrical wall, for receiving said absorbent slurry from said contacting means;

stirring means associated with said tank for stirring and circulating said slurry, said stirring means comprising at least one axial flow type stirrer which includes a rotating shaft extending substantially horizontally through said perimetrical wall of said tank and a propeller fixed to said rotating shaft, wherein said propeller has a backside proximal to said perimetrical wall and wherein said rotating shaft is offset at an angle to a phantom line normal, where said shaft extends through said wall, to said perimetrical wall feeding means for feeding oxidizer gas including oxygen into said absorbent slurry, along a portion of said rotating shaft through a nozzle and to said backside of said propeller towards the periphery of said propeller of at least one of said at least one axial flow type stirrer so that bubbles of the oxidizer gas are generated substantially uniformly over the entire circumference and within the rotational region of the propeller, said feeding means comprising: said nozzle, extending through said perimetrical wall into said absorbent slurry, said rotating shaft extending through said nozzle; a chamber for feeding said oxidizer gas to said nozzle and being in communication with said nozzle and surrounding said portion of said rotating shaft; and means for pressurizing the oxidizer gas entering said chamber; and means for withdrawing a part of the circulating slurry from said tank.

2. The apparatus according to claim 1, wherein said feeding means further includes a washing line for introducing a washing fluid into said chamber.

3. The apparatus according to claim 2, wherein said stirring means comprises a plurality of groups of the stirrers, each of said groups disposed separately from each other in a vertical direction and wherein one of said feeding means is provided together with each of said stirrers except for groups of stirrers disposed at a lowest position in said tank.

4. The apparatus according to claim 2, wherein said tank is a cylindrical tank associated with a plurality of stirrers, each of said stirrers are associated with one of said feeding means, said stirrers are equi-angularly spaced from each other circumferentially around said cylindrical tank.

5. The apparatus according to claim 1, wherein said feeding means includes a drain pipe through which said chamber is drained.

6. The apparatus according to claim 5, wherein said stirring means comprises a plurality of the stirrers, each of said groups disposed separately from each other in a vertical direction and one of wherein said feeding means is provided together with each of said stirrers except for groups of stirrers disposed at a lowest position in said tank.

7. The apparatus according to claim 5, wherein said tank is a cylindrical tank associated with a plurality of stirrers, each of said stirrers are associated with one of said feeding means, said stirrers are equi-angularly spaced from each other circumferentially around said cylindrical tank.

8. The apparatus according to claim 1, wherein said stirring means comprises a plurality of groups of the stirrers, each of said groups disposed separately from each other in a vertical direction and wherein one of said feeding means is provided together with each of said stirrers except for groups of stirrers disposed at a lowest position in said tank.

9. The apparatus according to claim 1, wherein said tank is a cylindrical tank associated with a plurality of stirrers, each of said stirrers are associated with one of said feeding means, said stirrers are equi-angularly spaced from each other circumferentially around said cylindrical tank.

10. The apparatus according to claim 1, wherein said nozzle is so disposed that an angle $\theta$, defined by a horizontal line extending through an end of said nozzle and an line extending through said end and an outer periphery of said propeller, is between 60° and 80°.

11. The apparatus according to claim 10, wherein said means for pressurizing said oxidizer gas pressurizes said oxidizer gas to achieve an outlet flow rate of said oxidizer gas at each nozzle within a range of 10 to 40 m/sec.

12. The apparatus according to claim 1, wherein said nozzle has a tapered end.

13. The apparatus according to claim 1, wherein said stirring means includes a means for sealing said rotating shaft, and wherein said chamber is so disposed that it covers said portion of said rotating shaft, said portion of said rotating shaft being between the sealing means and said propeller.

14. The apparatus according to claim 13, wherein said feeding means includes a flow meter for said oxidizer gas and a washing line connected to a downstream portion of said feeding means from said flow meter.

15. The apparatus according to claim 1, wherein said feeding means includes a flow meter for said oxidizer gas, and wherein an uppermost portion of a downstream portion of said feeding means from said flow meter is positioned higher than an uppermost level of said slurry in said tank.

16. The apparatus according to claim 1, wherein said feeding means includes a flow meter for said oxidizer gas, and a washing line connected to a downstream portion of said feeding means from said flow meter.

17. The apparatus according to claim 1, wherein the means for stirring said slurry comprises a plurality of axial flow type stirrers and said tank comprises a cylindrical tank, said plurality of axial flow type stirrers being arranged around the circumference of said tank to direct the absorbent slurry inwardly along the circumference of the tank to form a swirling flow of slurry within said tank.

18. The apparatus according to claim 17, wherein an axis of each of said plurality of axial flow type stirrers is offset relative to said phantom line at an angle in a range of 10° to 25°.

19. An apparatus for wet process desulfurization of exhaust gas, comprising:

a vertically extending absorbing tower having a slurry recirculation tank at a lower portion and having an upper portion having sprayers for spraying a slurry into contact with exhaust gas fed upwardly through said upper portion;

a plurality of precipitation preventing agitators extending through a perimetrical wall of said slurry recirculation tank at a lower portion thereof, said precipitation preventing agitators being arranged so as to contribute to a swirling flow of slurry in said recirculation tank;

a recirculation pump having a suction port at said lower portion of said slurry recirculation tank for recirculating slurry from said slurry recirculation tank though a recirculation line to said sprayers;

a plurality of oxidation agitators provided at an upper portion of said slurry recirculation tank above said plurality of precipitation preventing agitators and away from said suction port of said recirculation pump, each oxidation agitator comprising a rotating shaft, extending substantially horizontally through said perimetrical wall of said slurry recirculation tank and offset at an angle to a phantom line normal, where said shaft extends through said wall, to said perimetrical wall, and a propeller fixed to said rotating shaft, wherein said propeller has a backside proximal to said perimetrical wall, said plurality of oxidation agitators being arranged so as to contribute to said swirling flow of slurry in said recirculation tank;

a plurality of nozzles extending through said perimetrical wall of said slurry recirculation tank, each of said nozzles being arranged coaxially around the rotation shaft of one of said oxidation agitators, each of said nozzles, having a distal end adjacent the backside of the propeller fixed to the rotating shaft and having a proximal end connected to a chamber; and a pressurized oxidizer gas introduction pipe for introducing pressurized oxidizer gas into each of said chambers connected to each of said plurality of nozzles; whereby bubbles of said oxidizer gas are generated substantially uniformly over the entire circumference and within the rotational region of each of said propeller of said plurality of oxidation agitators.

* * * * *